United States Patent
Kim et al.

(10) Patent No.: US 9,738,526 B2
(45) Date of Patent: Aug. 22, 2017

(54) POPCORN-LIKE GROWTH OF GRAPHENE-CARBON NANOTUBE MULTI-STACK HYBRID THREE-DIMENSIONAL ARCHITECTURE FOR ENERGY STORAGE DEVICES

(71) Applicant: The Trustees of the Stevens Institute of Technology, Hoboken, NJ (US)

(72) Inventors: Youn-su Kim, Hoboken, NJ (US); Kitu Kumar, Princeton Junction, NJ (US); Eui-Hyeok Yang, Fort Lee, NJ (US); Frank Fisher, Union City, NJ (US)

(73) Assignee: THE TRUSTEES OF THE STEVENS INSTITUTE OF TECHNOLOGY, Hoboken, NJ (US)

( * ) Notice: Subject to any disclaimer, the term of this patent is extended or adjusted under 35 U.S.C. 154(b) by 0 days.

(21) Appl. No.: 14/019,799

(22) Filed: Sep. 6, 2013

(65) Prior Publication Data

US 2014/0127584 A1    May 8, 2014

Related U.S. Application Data

(60) Provisional application No. 61/697,448, filed on Sep. 6, 2012.

(51) Int. Cl.
*C01B 31/02* (2006.01)
*C01B 31/04* (2006.01)
(Continued)

(52) U.S. Cl.
CPC ............ *C01B 31/04* (2013.01); *B82B 3/0014* (2013.01); *B82B 3/0033* (2013.01);
(Continued)

(58) Field of Classification Search
CPC .......................... B82B 3/0047; C01B 31/0453
See application file for complete search history.

(56) References Cited

U.S. PATENT DOCUMENTS

| 4,772,924 A | 9/1988 | Bean et al. |
| 4,903,101 A | 2/1990 | Maserjian |
| (Continued) | | |

FOREIGN PATENT DOCUMENTS

| JP | 2010147237 A * | 7/2010 |
| WO | 2012073998 A1 | 6/2012 |
| WO | 2013119295 | 8/2013 |

OTHER PUBLICATIONS

Das et al "Synthesis and Characterization of self-organized mulitlayered graphene-carbon nanotube hybrid films" J. Mater. Chem. 2011, 21, 7289-7295.*

(Continued)

*Primary Examiner* — Nathan Empie
(74) *Attorney, Agent, or Firm* — Greenberg Traurig, LLP

(57) ABSTRACT

Graphene-carbon nanotube multi-stack three-dimensional architectures (graphene-CNT stacks) are formed by a "popcorn-like" growth method, in which carbon nanotubes are grown throughout the architecture in a continuous step. Alternating layers of graphene and a transition metal are grown by a vapor deposition process. The metal is fragmented and etched to form an array of catalytic sites. Carbon nanotubes grow from the catalytic sites in a vapor-solid-liquid process. The graphene-CNT stacks have applications in electrical energy storage devices, such as supercapacitors and batteries. The directly grown carbon nanotube array between graphene layers provides ease of ion diffusion and electron transfer, in addition to being an active material, spacer and electron pathway.

1 Claim, 3 Drawing Sheets

(51) Int. Cl.
  *B82B 3/00* (2006.01)
  *H01M 4/133* (2010.01)
(52) U.S. Cl.
  CPC ........ *B82B 3/0047* (2013.01); *C01B 31/0226* (2013.01); *C01B 31/0453* (2013.01); *H01M 4/133* (2013.01)

(56) References Cited

U.S. PATENT DOCUMENTS

| | | | |
|---|---|---|---|
| 5,238,868 A | 8/1993 | Elman et al. | |
| 6,813,064 B2 | 11/2004 | John et al. | |
| 7,167,355 B2 | 1/2007 | Chen | |
| 7,217,951 B2 | 5/2007 | Krishna et al. | |
| 7,387,253 B1 | 6/2008 | Parker et al. | |
| 7,550,755 B2 | 6/2009 | Balkenende et al. | |
| 7,628,928 B2 | 12/2009 | Guerra | |
| 7,830,926 B1 | 11/2010 | Kim | |
| 7,852,613 B2 | 12/2010 | Ma et al. | |
| 8,098,482 B2 | 1/2012 | Clelland et al. | |
| 8,206,469 B2 | 6/2012 | Chiang et al. | |
| 8,278,757 B2 | 10/2012 | Crain | |
| 8,455,842 B2 | 6/2013 | Zhang | |
| 8,697,485 B2 | 4/2014 | Crain | |
| 8,810,996 B2 | 8/2014 | Lee et al. | |
| 8,878,120 B2 | 11/2014 | Patil et al. | |
| 2003/0012249 A1 | 1/2003 | Eisenbeiser | |
| 2004/0099208 A1* | 5/2004 | Kang | B82Y 30/00 117/84 |
| 2005/0075245 A1* | 4/2005 | Goddard, III | B82Y 30/00 502/417 |
| 2007/0215855 A1 | 9/2007 | Kang | |
| 2010/0207254 A1 | 8/2010 | Jain et al. | |
| 2011/0042813 A1 | 2/2011 | Crain | |
| 2011/0052813 A1 | 3/2011 | Ho | |
| 2011/0101309 A1 | 5/2011 | Lin et al. | |
| 2011/0114894 A1* | 5/2011 | Choi | B82Y 10/00 252/503 |
| 2012/0007913 A1 | 1/2012 | Jang | |
| 2012/0121891 A1 | 5/2012 | Kim | |
| 2012/0128983 A1 | 5/2012 | Yoon | |
| 2012/0152725 A1* | 6/2012 | Barker | B82Y 30/00 204/157.44 |
| 2012/0170171 A1 | 7/2012 | Lee | |
| 2012/0235119 A1 | 9/2012 | Babich et al. | |
| 2012/0244358 A1 | 9/2012 | Lock | |
| 2012/0255860 A1 | 10/2012 | Briman et al. | |
| 2012/0270205 A1 | 10/2012 | Patel | |
| 2013/0264011 A1 | 10/2013 | Lin | |
| 2013/0264192 A1 | 10/2013 | Lin | |
| 2013/0264193 A1 | 10/2013 | Lin | |
| 2013/0264307 A1 | 10/2013 | Lin | |
| 2013/0266729 A1 | 10/2013 | Lin | |
| 2014/0103298 A1 | 4/2014 | Lee | |
| 2014/0205841 A1 | 7/2014 | Qiu et al. | |
| 2014/0231002 A1 | 8/2014 | Patil et al. | |
| 2014/0321028 A1 | 10/2014 | Lee et al. | |

OTHER PUBLICATIONS

Du et al "Preparation of Tunable 3D Pillared Carbon Nanotube-Graphene Networks for High Performance Capacitance" Chem. Mater. 2011, 23, 4810-4816.*
Fan et al "A Three-Dimensional Carbon Nanotube / Graphene Sandwich and Its Application as Electrode in Supercapacitors" Adv. Mater. 2010, 22, 3723-3728.*
Zhang et al "Energy-Absorbing Hybrid Composites Based on Alternate Carbon-Nanotube and Inorganic Layers" Adv. Mater. 2009, 21, 2876-2880.*
Zhang et al "Pillaring Chemically Exfoliated Graphene Oxide with Carbon Nanotubes for Photocatalytic Degradation of Dyes under Visible Light Irradiation" V4, No. 11 p. 7030-7036.*
Zhou, M. et al., Controlled Synthesis of Large-Area and Patterned Electrochemically Reduced Graphene Oxide Films, Chem. Eur. J., 2009, 15, pp. 6116-6120.
Notice of Allowance dated Jan. 22, 2015 in reference to U.S. Appl. No. 14/327,716.
Non-Final Office Action dated Aug. 15, 2014 in reference to U.S. Appl. No. 14/327,716.
Non-Final Office Action dated Dec. 6, 2013 in reference to U.S. Appl. No. 13/301,124.
Final Office Action dated Jun. 25, 2014 in reference to U.S. Appl. No. 13/324,622.
First Action Interview Program Communication dated Nov. 6, 2014 regarding U.S. Appl. No. 14/053,232.
Akhavan, O. et al., Toxicity of graphene and graphene oxide nanowalls against bacteria, ACS Nano, 4 (2010) 5731-5736.
Bolotin, K. et al., Ultrahigh electron mobility in suspended graphene; Solid State Communications, 146 (2008) 351-355.
Bourlinos, A. et al., Graphite oxide: Chemical reduction to graphite and surface modification with primary aliphatic amines and amino acids, Langmuir, 19 (2003) 6050-6055.
Chen, Z. et al., Three-dimensional flexible and conductive interconnected graphene networks grown by chemical vapour deposition, Nature Materials, 10 (2011) 424-428.
Coleman, J.N., Liquid-Phase Exfoliation of Nanotubes and Graphene, Advanced Functional Materials, 19 (2009) 3680-3695.
Cote, L. et al., Flash Reduction and Patterning of Graphite Oxide and Its Polymer Composite, Journal of the American Chemical Society, 131 (2009) 11027-11032.
Dikin, D. et al., Preparation and characterization of graphene oxide paper, Nature, 448 (2007) 457-460.
Dreyer, D. et al., The chemistry of graphene oxide, Chemical Society reviews, 39 (2010) 228-240.
Dreyer, D. et al., From Conception to Realization: An Historical Account of Graphene and Some Perspectives for Its Future, Angewandte Chemie International Edition, 49 (2010) 9336-9344.
El-Kady, M. et al., "Laser Scribing of High-Performance and Flexible Graphene-Based Electrochemical Capacitors," Science, vol. 335, No. 6074, pp. 1326-1330, Mar. 2012.
Gao, X. et al., Hydrazine and thermal reduction of graphene oxide: Reaction mechanisms, product structures, and reaction design, Journal of Physical Chemistry C, 114 (2010) 832-842.
Hong, A. et al., "Graphene Flash Memory," ACS Nano 5 (10), 7812-7817 (2011).
Ferrari, A. et al., Inkjet-Printed Graphene Electronics; ACS Nano, vol. 6, No. 4, 2992-3006, (2012).
Kim, F. et al., Graphene oxide: Surface activity and two-dimensional assembly, Advanced Materials, 22 (2010) 1954-1958.
Kim, J. et al., Graphene oxide sheets at interfaces, Journal of the American Chemical Society, 132 (2010) 8180-8186.
Kong, D. et al., Temperature-Dependent Electrical Properties of Graphene Inkjet-Printed on Flexible Materials, Langmuir, ACS Publications, American Chemical Society, 28, (2012) pp. 13467-13472.
Lee, Y. et al., "Wafer-Scale Synthesis and Transfer of Graphene Films," Nano Letters 10 (2), 490-493 (2010).
Li, D. et al., Processable aqueous dispersions of graphene nanosheets, Nat Nano, 3 (2008) 101-105.
Li, X. et al., Large-Area Synthesis of High-Quality and Uniform Graphene Films on Copper Foils, Science, 324 (2009) 1312-1314.
Lin, Y. et al., "100-GHz Transistors from Wafer-Scale Epitaxial Graphene," Science, 327 (2010) p. 662.
Lin, Y. et al., "Wafer-Scale Graphene Integrated Circuit," Science 332 (6035), 1294-1297 (2011).
Luo, J. et al., Compression and Aggregation-Resistant Particles of Crumpled Soft Sheets, ACS Nano, 5 (2011) 8943-8949.
Luo, J. et al., Graphene oxide nanocolloids, Journal of the American Chemical Society, 132 (2010) pp. 17667-17669.
Novoselov, K. et al., Electric Field Effect in Atomically Thin Carbon Films, Science, 306 (2004) pp. 666-669.
Park, J. et al., Multi-scale graphene patterns on arbitrary substrates via laser-assisted transfer-printing process, Applied Physics Letters, vol. 101, No. 4, (2012) p. 043110-043110-4.

(56) References Cited

OTHER PUBLICATIONS

Park, S. et al., Chemical methods for the production of graphenes, Nat Nano, 4 (2009) 217-224.
Shao, G. et al., Graphene oxide: The mechanisms of oxidation and exfoliation, Journal of Materials Science, 47 (2012) 4400-4409.
Stankovich, S. et al., Synthesis of graphene-based nanosheets via chemical reduction of exfoliated graphite oxide, Carbon, 45 (2007) 1558-1565.
Stoller, M. et al., Graphene-Based ultracapacitors; Nano Letters, 8 (2008) 3498-3502.
Torrisi, F. et al., Inkjet-Printed Graphene Electronics, ACS Nano, vol. 6, No. 4, (2012) 2992-3006.
Wu, Z.S. et al., Graphene/metal oxide composite electrode materials for energy storage, Nano Energy, 1 (2012) 107-131.
Zangmeister, C.D., Preparation and evaluation of graphite oxide reduced at 220 c, Chemistry of Materials, 22 (2010) 5625-5629.
Zhang, Y. et al., Cytotoxicity effects of graphene and single-wall carbon nanotubes in neural phaeochromocytoma-derived pc12 cells, ACS Nano, 4 (2010) 3181-3186.
Zhang, Y. et al., "Direct imprinting of microcircuits on graphene oxides film by femtosecond laser reduction," Nano Today, vol. 5, (2010) pp. 15-20.
Zhu, Y. et al., Carbon-Based Supercapacitors Produced by Activation of Graphene; Science, 332 (2011) 1537-1541.
Havener, R. et al., Hyperspectral Imaging of Structure and composition in Atomically Thin Heterostructures; ACS Nano, 13 (2013) 3942-3946.
Ko, S. et al., Unconventional, Laser Based OLED Material Direct Patterning and Transfer Method; Organic Light Emitting Diode—Material, Process and Devices; Intech, ISBN: 978-953-307-273-9.
Lee, K. et al., Effect of Laser Beam Trajectory on Donor Plate in Laser Induced Thermal Printing Process; Journal of the Optical Society of Korea, vol. 15, No. 4, Dec. 2011, pp. 362-367.
Cho, S. et al., Enhanced efficiency of organic light emitting devices (OLEDs) by control of laser imaging condition; Organic Electronics 13 (2012) 833-839.
Olivares-Marín, M. et al., Cherry stones as precursor of activated carbons for supercapacitors; Materials Chemistry and Physics 114, 1, (2009) 223-227.
An, L. et al., Optical and Sensing Properties of 1-Pyrenecarboxylic Acid-Functionalized Graphene Films Laminated on Polydimethylsiloxane Membrane, American Chemical Society, vol. 5, No. 2, (2011), pp. 1003-1011.
Le, L. et al., Graphene supercapacitor electrodes fabricated by inkjet printing and thermal reduction of graphene oxide, Electrochemistry Communications, vol. 13, (2011), pp. 355-358.
Le, L. et al., Inkjet-Printed Graphene for Flexible Micro-Supercapacitors, IEEE International Conference on Nanotechnology, Aug. 15-18, 2011, Portland, Oregon, USA, pp. 67-71.
Huang, L. et al., Graphene-Based Conducting Inks for Direct Inkjet Printing of Flexible Conductive Patterns and Their Applications in Electric Circuits and Chemical Sensors, Nano Res, (2011) 9 pages.
Jacoby, M., Graphene Moves Toward Applications, www.cen-online.org, Nov. 21, 2011, pp. 10-15.
Jang, B.Z. et al., Processing of nanographene platelets (NGPs) and NGP nanocomposites: a review; Journal of Materials Science 43, 5092-5101, (2008).
Jang, B.Z. et al., Graphene-Based Supercapacitor with an Ultrahigh Energy Density; NanoLetters, 10, 4863-4868, (2010).
U.S. Appl. No. 14/327,716, filed Jul. 10, 2014.
U.S. Appl. No. 14/327,753, filed Jul. 10, 2014.

* cited by examiner

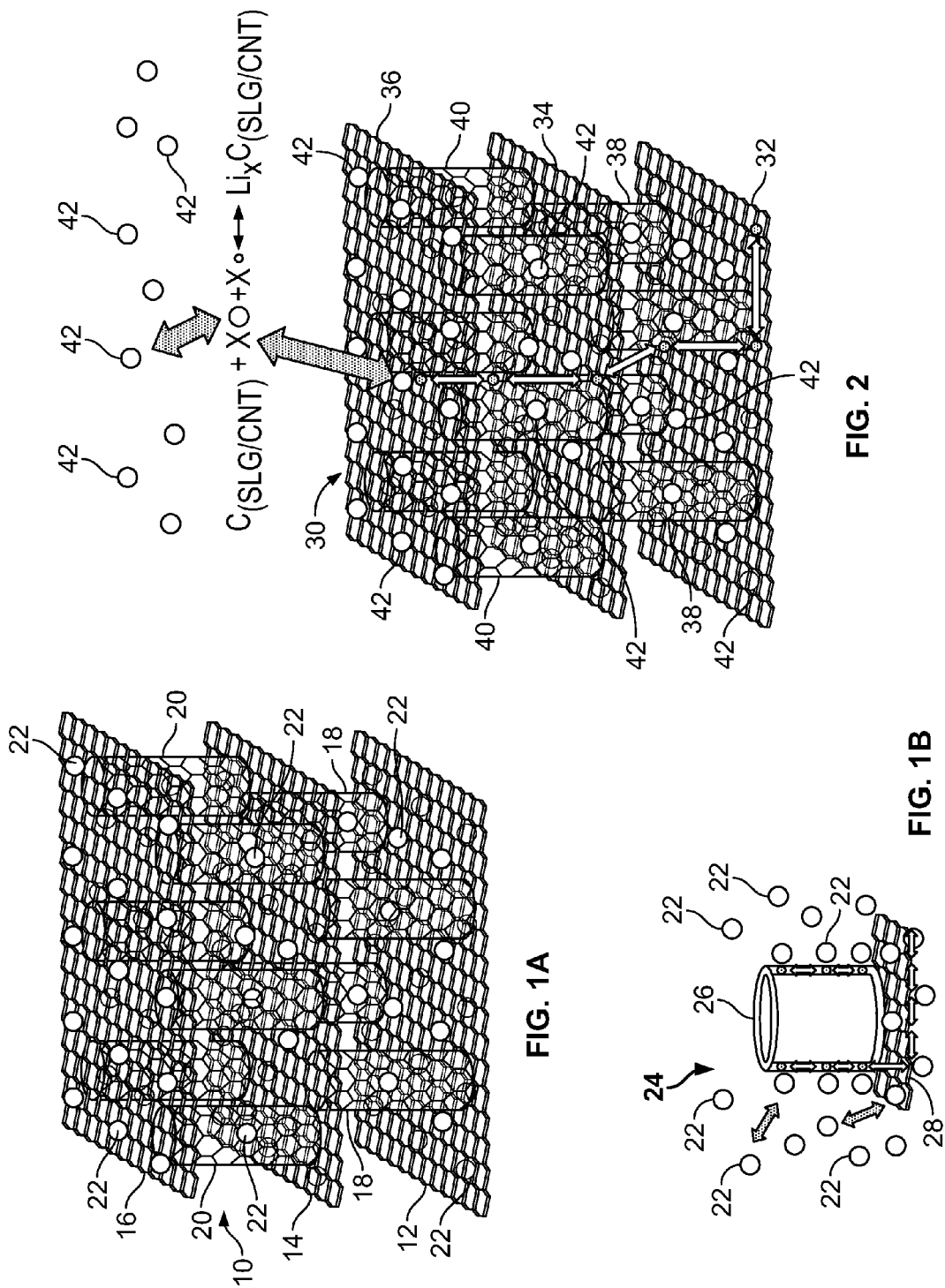

POPCORN-LIKE GROWTH OF GRAPHENE-CARBON NANOTUBE MULTI-STACK HYBRID THREE-DIMENSIONAL ARCHITECTURE FOR ENERGY STORAGE DEVICES

CROSS-REFERENCE TO RELATED APPLICATIONS

The present application claims the benefit of U.S. Provisional Patent Application No. 61/697,448, filed on Sep. 6, 2012, the disclosure of which is incorporated by reference herein.

FIELD OF THE INVENTION

The present invention relates to three-dimensional carbon architectures for energy storage and methods for making same, and, more particularly, to graphene-carbon nanotube multi-stack three-dimensional architectures fabricated using chemical deposition techniques.

BACKGROUND OF THE INVENTION

Energy storage devices, such as supercapacitors and lithium ion batteries comprise active materials, electrolytes and separators. For optimal energy storage, active materials should have large surface areas, chemical and mechanical stability, and good electrical properties, especially electrical conductivity. As such, carbon-based materials are widely used in practical and commercially-feasible energy storage devices. Modified carbon-based materials such as activated carbon, carbon nanotubes and graphene have been suggested for such applications, but are limited in their performance due to self-aggregation and the presence of micropores, both phenomena restricting ion diffusion and causing loss of active surface area.

SUMMARY OF THE INVENTION

According to an embodiment of the present invention, a graphene-carbon nanotube multi-stack three-dimensional architecture ("graphene-CNT stack") comprises alternating layers of graphene and carbon nanotubes (CNT). The CNT function as both physical spacers and electrical conduits between the graphene layers, and may be substantially parallel to each other.

According to another embodiment of the present invention, a method of fabrication of graphene-CNT stacks includes the steps of: (i) depositing a first graphene layer on a metal foil; (ii) transferring the first graphene layer to a current collector; (iii) depositing a first layer of a catalytic metal on the first graphene layer; (iv) alternately depositing graphene and catalytic metal layers one upon the other so as to form a stack of alternating graphene and catalytic metal layers on the first graphene and catalytic metal layers; (v) transforming the catalytic metal layers into arrays of metal nanoparticles by thermal breakdown of the catalytic metal layers; and (vi) precipitating CNT outward from the metal nanoparticles. In embodiments of the present invention, the CNT are precipitated in a single execution of step (vi), resulting in simultaneous growth of the CNT and expansion of the graphene-CNT stack. Such simultaneous growth and expansion, implemented in a single step, is referred to herein as "popcorn-like growth". In some embodiments of the present invention, the catalytic metal is a transition metal. In some such embodiments, the transition metal is nickel. In some embodiments, the graphene layers are formed by a chemical vapor deposition process. In some embodiments, the CNT are formed by a chemical vapor deposition process. In some embodiments, the catalytic metal layers are formed by a physical vapor deposition process.

BRIEF DESCRIPTION OF THE DRAWINGS

For a more complete understanding of the present invention, reference is made to the following detailed description of an exemplary embodiment considered in conjunction with the accompanying drawings, in which:

FIG. 1 is a schematic illustration of (a) a graphene-CNT stack, according to an embodiment of the present invention; and (b) electron flow in the graphene-CNT stack;

FIG. 2 is a schematic illustration of a graphene-CNT stack and a schematized electrochemical reaction, according to another embodiment of the present invention;

DETAILED DESCRIPTION OF THE EXEMPLARY EMBODIMENT

Figure 3:
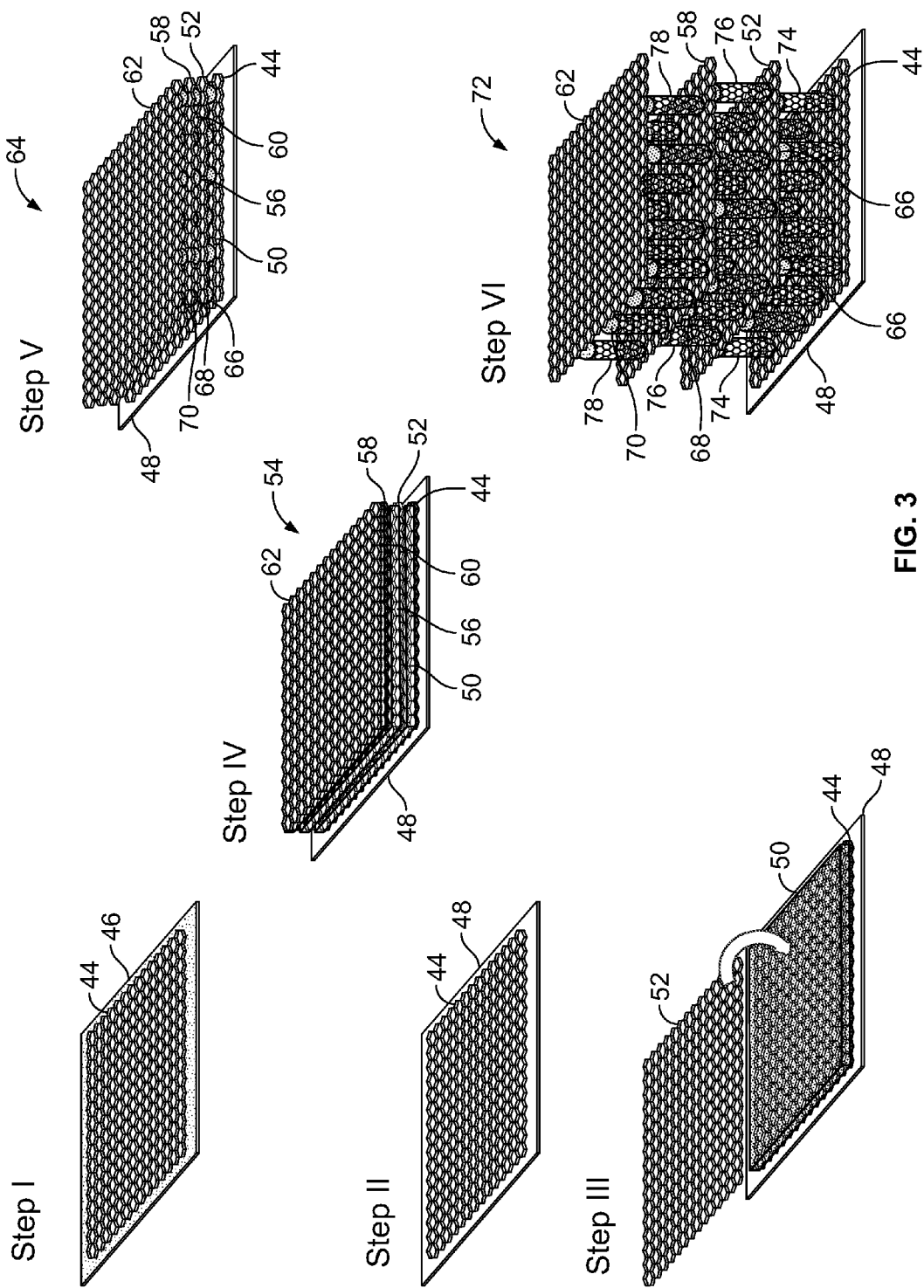
FIG. 3 is a series of schematic illustrations representing a series of steps for fabricating a graphene-CNT stack, according to an embodiment of the present invention.

Carbon-based materials are widely used as electrode materials for energy storage applications due to their mechanical and chemical stability, excellent intrinsic electrical conductivity, and large surface area. However, they often show restricted performance due to the loss of active surface area for charged ion storage and ion diffusion owing to self-aggregation and micropore generation in the carbon electrode. Graphene-carbon nanotube multi-stack three-dimensional architectures (hereinafter "graphene-CNT stacks"), which are embodiments of the present invention, can overcome the limitations and restricted device performance typically encountered with carbon-based electrode materials by using the combined strategies of three-dimensional architecture and low-dimensional carbon nanomaterial characteristics. Such graphene-CNT stacks have one or more of the following characteristics: 1) graphene and CNT are active materials that have electrical properties preferred for high-capacity electrical energy storage, particularly high surface area (theoretically, 1320 $m^2/g$ for CNT and 2630 $m^2/g$ for graphene), and high electrical conductivity; 2) the CNT array of the graphene-CNT stack acts as a spacer to prevent graphene self-aggregation, maintaining a large active surface area; 3) the optimized CNT length and short ion diffusion length within the graphene-CNT stack facilitate ion diffusion; 4) stable electrical and mechanical contact is generated between CNT and graphene due to the direct growth of CNT between the graphene layers; and 5) the fabrication process is based on fabrication steps that are simple and easily executed.

FIG. 1 (a) is a schematic illustration of a graphene-CNT stack 10 in an electrolyte solution according to an embodiment of the present invention. The stack 10 comprises a number of large-area graphene layers 12, 14, 16, separated by dense arrays of CNT 18, 20 during growth, and electrically interconnected therewith. The CNT 18, 20 are substantially parallel to each other because of van der Waals repulsions among the CNT 18, 20. This open architecture allows ions 22 from an electrolyte solution (not shown) to penetrate the graphene-CNT stack, allowing a substantial electrical charge to accumulate. Negative charges can be distributed across both the graphene layers 12, 14, 16, and the CNT 18, 20. This is illustrated in FIG. 1 (*b*), which is a schematic diagram of a portion of a stack 24 having CNT 26 connected to a graphene layer 28. The distribution of charges across the CNT 26 and graphene layer 28 is shown by the small arrows along the surfaces of the CNT 26 and graphene layer 28. The larger arrows outside of the CNT 26 and graphene layer 28 indicate ion diffusion from the stack and a high degree of charge separation, which is preferable for supercapacitors.

FIG. 2 is a schematic illustration of a graphene-CNT stack 30 in a lithium ion solution according to an embodiment of the present invention that is suited for use in lithium-ion batteries. Similar in construction to stack 10 of FIG. 1(*a*), the stack 30 comprises a number of large-area graphene layers 32, 34, 36, separated by dense arrays of CNT 38, 40, electrically interconnected therewith. Lithium ions 42 from an electrolyte solution (not shown) penetrate the graphene-CNT stack 30, where they are electrochemically reduced, as shown in the equation associated with FIG. 2. In this example, the stack 30 serves as an anode, the open architecture of stack 30 facilitating the diffusion of the lithium ions into and out of the stack 30 and, thus, facilitating the electrochemical reaction. The small arrows in FIG. 2 indicate transport paths for the electrons across the surfaces of the graphene layers 32, 34, 36 and the CNT 38, 40. The large arrows outside of the stack 30 indicate the insertion and extraction of lithium ions into and out of the stack 30.

According to an embodiment of a method according to the present invention, a graphene-CNT stack may be fabricated by sequentially developing a stack of alternating graphene and catalytic metal layers, breaking down the metal layers into catalytic nanoparticles, and causing the simultaneous growth of the CNT between the graphene layers at the sites of the catalytic nanoparticles and the expansion of the graphene-CNT stack (i.e., "popcorn-like growth"). The following steps are included in an exemplary embodiment of the present invention:

Step I: A graphene layer 44 is grown on copper (Cu) foil 46 via a surface-catalyzed chemical vapor deposition (CVD) process using a carbon feedstock and Ar/$H_2$ gas at about 1000° C.

Step II: After the graphene layer 44 is formed, thermal release tape (not shown) or a thin polymer backing support (not shown) is placed or spin-coated on the graphene-copper stack 44, 46 as a protectant for the graphene layer 44 during wet chemical processing. The Cu foil 46 is subsequently etched using copper etchant (not shown) and the tape/graphene or polymer/graphene stack is transferred to a current collector 48 (e.g., stainless steel or electrically conductive material). The thermal tape or polymer layer is removed using heat or solvents/annealing processes, respectively.

Step III: A 5-10 nm thick layer 50 of a catalyst metal (e.g., a transition metal such as Co, Ni, Fe, etc.) is deposited on the graphene layer 44 by physical vapor deposition processes (e.g., pulsed laser deposition, thermal evaporation, electron-beam evaporation, etc.). A graphene layer 52 may then be formed on the catalyst metal layer 50.

Step IV: Steps II and III are repeated sequentially on the sample to fabricate a multi-layered graphene-catalyst metal stack 54. For example, a multilayered stack 54 may include graphene layers 44, 52, 58, 62, alternating with catalyst metal layers 50, 56, 60.

Step V: The catalyst metal layers 50, 56, 60 are broken down by exposure to temperatures between 600° C. and 900° C. in an $H_2$ atmosphere, thus transforming multilayer stack 54 to a multilayer stack 64 having dense catalyst nanoparticle arrays 66, 68, 70 between the graphene layers 44, 52, 58, 62.

Step VI: The multilayer stack 54 is transformed to a graphene-CNT stack 72 through a popcorn-like growth process. Such popcorn-like growth occurs by precipitating CNT 74, 76, 78 outward from the catalyst nanoparticle arrays 66, 68, 70 between the existing graphene layers 44, 52, 58, 62 via a vapor-solid-liquid process discussed further below. In an embodiment of the present method, a carbon feedstock and Ar/$H_2$ gas at temperatures between 600° C. and 900° C. are used to grow the CNT 74, 76, 78. The close proximity to each other of the catalyst nanoparticles in the arrays 66, 68, 70 promotes the vertical growth of the CNT 74, 76, 78 parallel to each other, since the CNT 74, 76, 78 repel each other as they grow. The resultant structure 72 is a stack of forests of multiple CNT 74, 76, 78 which serve as spacers between the graphene layers 44, 52, 58, 62 and are electrically connected thereto.

With further regard to the growth of graphene or CNT according to embodiments of the present invention, in general, CVD growth of both graphene and CNT may occur in a quartz tube furnace with inlets for argon (Ar), hydrogen ($H_2$) and the desired feedstock gas (e.g., methane, or C2-C3 species such as ethylene or propylene). The metal catalyst is usually placed in the center of the quartz tube. Other CVD methods for creating CNT are discussed in Dai, Hongjie, Nanotube Growth and Characterization, in Dresselhaus, et al. (Eds.): Carbon Nanotubes, Topics Appl. Phys. 80, 29-53 (2001), the disclosure of which is incorporated by reference herein.

When the growth tube furnace CVD method is adapted to grow graphene, as in Step I, annealing the catalytic metal at a temperature of about 1000° C. in the presence of $H_2$ removes an undersired oxide layer and increases metal grain size. The catalytic metal is typically Cu, but may be Ni, Ru, Pt, or other transition metals, alloys thereof, or other suitable catalysts for the decomposition of the carbon feedstocks. Graphene synthesis begins when the carbon feedstock is introduced into the furnace tube, where it thermally decomposes into carbon and hydrogen radicals in the presence of the catalyst. In the case of Cu, growth is limited to the surface of the metal. The dissociated carbon species diffuse across the surface of the metal, where they nucleate as seeds which grow and coalesce to form a continuous graphene film.

When the growth tube furnace method is adapted to grow CNT, the catalyst metal film is heated to the desired annealing temperature (e.g., 600-900° C.). The desired temperature is held for 30-45 minutes to ensure the thermal breakdown of the metal film into nanoparticles via film stress induced by the thermal coefficient mismatch between the film and underlying substrate, and subsequent particle "shaping" or etching by $H_2$ gas. The annealing temperature may be selected to provide nanoparticles within desired density and size ranges. Higher temperatures result in smaller, denser particles, but may increase the risk of etching the graphene layer. Nanoparticle sizes within the arrays might not be uniform, and their distribution may be irregular, rather than a uniform array. Depending on the initial thickness of the catalyst metal film, the diameter ranges may be 2-5 nm for nanoparticles formed at higher temperatures (e.g., 900° C.), or 50-100 nm for nanoparticles formed at lower temperatures (e.g., 700° C.).

The carbon feedstock is then introduced into the furnace tube, where it thermally decomposes into carbon and hydrogen radicals in the presence of the catalyst nanoparticles, and the gaseous carbon species dissolve into the nanoparticles. This dissolution is known as a vapor-solid-liquid process and it occurs until the nanoparticles reach a point of carbon supersaturation, after which the carbon is precipitated/expelled outward as a solid CNT. In some embodiments of the present invention, the reaction temperature for formation of the CNT is held near the catalytic dissociation temperature of the carbon species being introduced into the furnace tube. Under many conditions, the CNT will continue to increase in length as long as the carbon source is being introduced into the furnace tube. The maximum diameters of the CNT are limited by the diameters of the catalytic nanoparticles from which they are precipitated.

Figure 4:
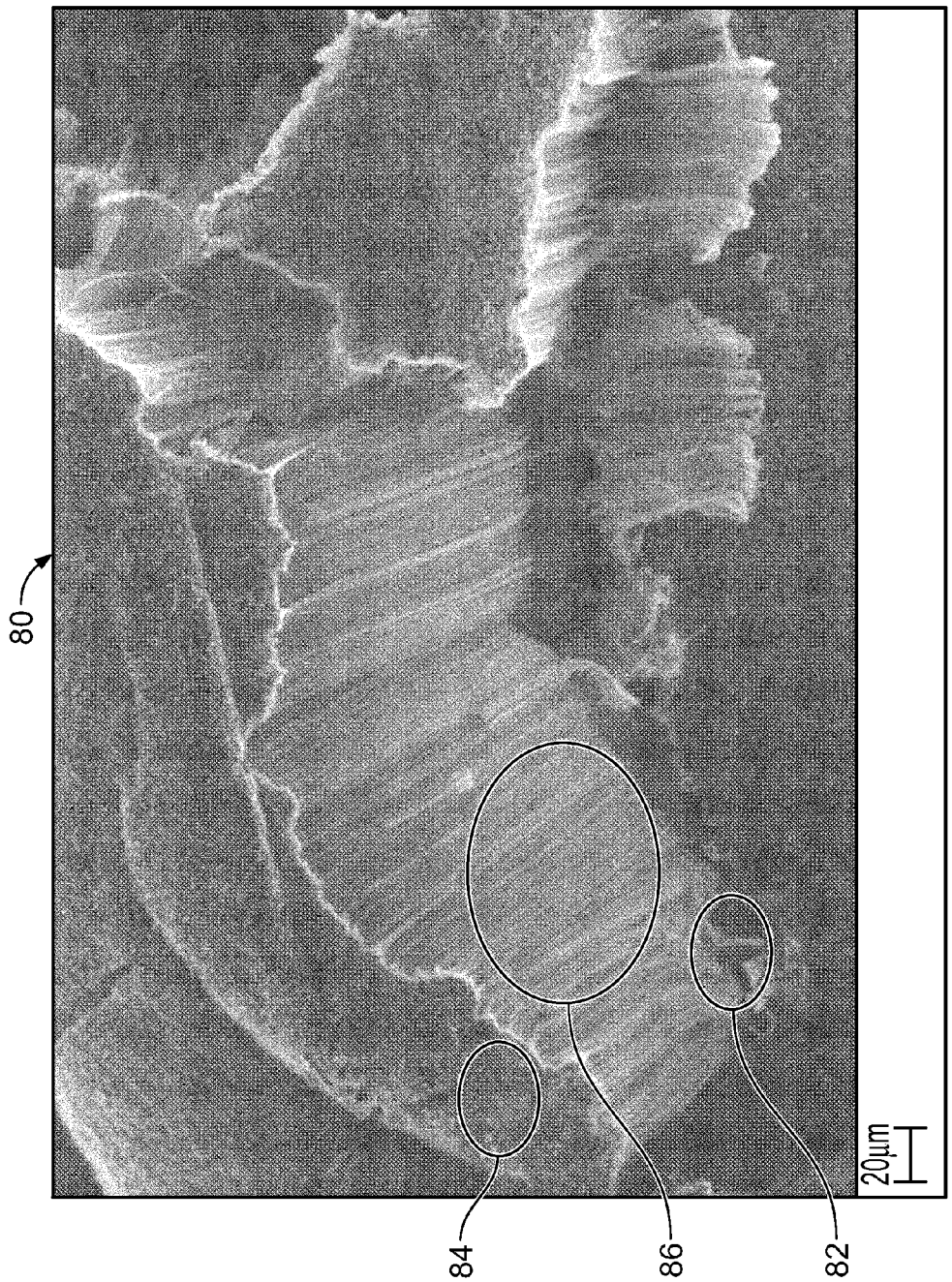
FIG. 4 is a scanning electron microscope (SEM) image of a graphene-CNT stack architecture according to an embodiment of the present invention.

Referring now to FIG. 4, which is a SEM photograph of a single-layer stack 80 (i.e., CNT 82 separating graphene layers 84, 86) fabricated through a popcorn-like growth method, with CNT 82 grown directly between the graphene layers 84, 86. The popcorn-like growth method maximizes the active surface area of the graphene-CNT stack 80, maintains an appropriate gap within the stack 80 for ion diffusion, and generates stable electric contact between CNT 82 and graphene layers 84, 86 for electron transfer. By controlling the number of stacks, predictable and manageable device performance can be obtained. Thus, the popcorn-like growth technique can achieve high power density in electrical energy storage devices.

The stack 80 of FIG. 4 has graphene layers 84, 86 approximately 1 cm square. The CNT 82 are in the range of 80 to 90 microns in length. The areas of the graphene layers in a graphene-CNT stack of the present invention are limited only by the availability of suitable technologies for forming large area graphene layers. In some embodiments of the present invention, CNT suitable for the graphene-CNT stack of the present invention may be several millimeters in length.

With further reference to the SEM photograph of FIG. 4, an SEM utilizes an electron beam to image the sample, such as the stack 80. When the beam hits the sample and interacts with its atoms, electrons are emitted from the sample and captured by a detector that converts this signal into a visual image.

The graphene-CNT stack architecture is highly conductive and therefore can easily be imaged with the SEM. The sample in FIG. 4 (i.e., stack 80) was peeled and scratched with tweezers to expose the CNT array 82 between the graphene layers 84, 86. FIG. 4 was imaged using an in lens SEM detector, a beam operating voltage of 5 kV.

It will be understood that the embodiments described herein are merely exemplary and that a person skilled in the art may make many variations thereof and modifications thereto without departing from the spirit and scope of the invention. All such variations and modifications are intended to be included within the scope of the invention, which is described in the appended claims.

We claim:

1. A method of fabricating a graphene-carbon nanotube stack, comprising the steps of:
   (a) alternately depositing graphene layers and catalytic metal layers one upon another so as to form a stack of alternating graphene layers and catalytic metal layers;
   (b) transforming the catalytic metal layers into arrays of metal nanoparticles by thermal breakdown of the catalytic metal layers; and
   (c) precipitating carbon nanotubes outward from the metal nanoparticles, said carbon nanotubes pushing graphene layers adjacent to the carbon nanotubes away from each other.

* * * * *